United States Patent Office 3,702,892
Patented Nov. 14, 1972

3,702,892
HALOBENZOYLPROPIONIC ACID ESTERS AS INSECT REPELLANTS
Gerhard Bachmann and Heinrich Adolphi, Ludwigshafen, Germany, assignors to Badische Anilin- & Soda-Fabrik Aktiengesellschaft, Ludwigshafen (Rhine), Germany
No Drawing. Filed May 4, 1970, Ser. No. 34,623
Claims priority, application Germany, May 10, 1969, P 19 23 916.8
Int. Cl. A01n 9/24
U.S. Cl. 424—308        5 Claims

ABSTRACT OF THE DISCLOSURE

New and valuable halobenzoylpropionic acid esters which have a strong repellent action on insects, and a process for repelling insects with these active ingredients.

---

The invention relates to new and valuable halobenzoylpropionic acid esters and agents for repelling insects containing these compounds.

In addition to the control of insect pests and troublesome insects by means of insecticides which kill the insects or impair their vital power, the repelling of insects with insectifuges is of considerable importance. It is the object of these compounds, which have no toxic action on insects, to prevent the insect pests from settling on a surface treated with these agents, e.g. the skin of humans or animals.

It is known to use dimethyl phthalate and m-toluic acid-N,N-diethylamide as insectifuges; however, their action is not satisfactory.

We have now found that halobenzoylpropionic acid esters having the formula

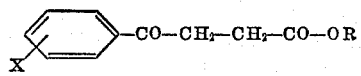

where X denotes a halogen radical (chlorine, iodine, preferably bromine) and R denotes an aliphatic hydrocarbon radical having 1 to 10 carbon atoms (methyl, ethyl, n-propyl, isopropyl, n-butyl, isobutyl, n-pentyl, isopentyl, n-hexyl, 2-ethylhexyl, nonyl, and decyl), which may be substituted by halogen (chlorine, bromine, iodine), hydroxyl or alkoxyl (methoxyl, ethoxyl), are eminently suitable as insectifuges. Some examples of substituted aliphatic hydrocarbon radicals are 2-methoxyethyl, 2-ethoxyethyl, 2-butoxyethyl and 2-chloroethyl. It is preferred to use the p-bromobenzoylpropionic acid esters.

The active ingredients may be applied in such a way that the objects to be protected against insect attack, e.g. inanimate objects such as wood, leather and paper, or living creatures such as humans and animals (pets, ungulata), are treated especially on the surface (skin) with the active ingredients.

The halobenzoylpropionic acid esters may be prepared by reacting the halobenzoylpropionic acids, obtained by reaction of halobenzenes with succinic anhydride, with the appropriate alcohols in the presence of a mineral acid.

Example illustrating the preparation of the active ingredients 250 parts (by weight) of bromobenzene, 30 parts of succinic anhydride and 90 parts of anhydrous aluminum chloride are stirred for 2 hours on a boiling water bath. After cooling, first 150 parts of water and then 50 parts of concentrated hydrochloric acid are dripped into the mixture. The excess bromobenzene is distilled off with steam. The oily residue, which solidifies upon cooling, is separated, dissolved in sodium carbonate solution, filtered and precipitated again by acidifying with hydrochloric acid. After suction filtration and washing, 55 parts of p-bromobenzoylpropionic acid having a melting point of 140° to 143° C. is obtained.

p-Bromobenzoylpropionic acid ethyl ester 200 parts of p-bromobenzoylpropionic acid and 2400 parts of absolute ethanol are boiled for 4 hours under reflux while passing in a stream of dry HCl. As much of the alcohol as possible is distilled off, the residue is stirred in sodium carbonate solution, suction filtered, washed until neutral and dried. 213 parts of p-bromobenzoylpropionic acid ethyl ester having a melting point of 56° to 57° C. is obtained.

The following halobenzoylpropionic acid esters are listed by way of example:

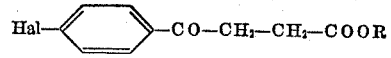

| Active ingredient No. | Hal | R | Yield, percent | M.P., °C. | B.P. |
|---|---|---|---|---|---|
| 1 | Br | CH₃ | 97 | 43 | |
| 2 | Br | C₂H₅ | 96 | 57 | |
| 3 | Br | Iso-C₃H₇ | 90 | 58 | |
| 4 | Br | Iso-C₄H₉ | 85 | | 145° C./0.15 mm. |
| 5 | Br | n-C₆H₁₃ | 84 | | 196° C./2 mm. |
| 6 | Br | —CH₂—CH₂—OCH₃ | 50 | | 160° C./0.4 mm. |
| 7 | Br | —CH₂—CH₂—Cl | 80 | 45 | |
| 8 | Cl | —C₂H₅ | 85 | 58 | |
| 9 | Cl | n-C₄H₉ | 84 | 50 | |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling point higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following experiments demonstrate the use of the agents according to the invention.

EXAMPLE 1

Action on *Aedes aegypti* (gnat):

The apparatus for the experiment consists of two boxes each 50 cm. long which are separated from each other by a 2.5 mm. mesh gauge screen. The screen is impregnated with a 0.1% (by weight) acetonic solution of the active ingredients. After the solvent has evaporated, 300 gnats are introduced into one of the boxes. At varying intervals in time, counts are made as to (a) how many gnats have settled on the screen, and
(b) how many gnats have crossed through the treated screen into the empty box.

Result (a)

| Time | Number of gnats on the screen | | | |
|---|---|---|---|---|
| | 80 mins. | 150 mins. | 4½ hrs. | 6 hrs. |
| Active ingredient No. 2 | 0 | 0 | 1 | 4 |
| Dimethyl phthalate | 16 | 38 | 40 | 38 |
| Control (untreated) | 70 | 60 | 60 | 45 |

Result (b)

| Time | Number of gnats in the second box | | | | |
|---|---|---|---|---|---|
| | 10 mins. | 30 mins. | 1 hr. | 2 hrs. | 6 hrs. |
| Active ingredient No. 2 | 1 | 1 | 3 | 5 | 30 |
| Dimethyl phthalate | 8 | 15 | 25 | 50 | 110 |
| m-Toluic acid-N,N-diethylamide | 10 | 7 | 12 | 30 | |
| Control (untreated) | 50 | 90 | 115 | 140 | 210 |

These results show that active ingredient No. 2 is far superior to the known active ingredients employed for comparison purposes.

EXAMPLE 2

In feeding tests with houseflies (*Musca domestica*), an addition of 0.25% (by weight) of active ingredients Nos. 1, 2, 4 and 7 to lactose tablets prevents hungry houseflies from feeding on the tablets.

EXAMPLE 3

60 parts by weight of compound 1 is mixed with 40 parts by weight of N-methyl-α-pyrrolidone. A mixture is obtained which is suitable for application in the form of very fine drops.

EXAMPLE 4

20 parts by weight of compound 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of compound 3 is dissolved in a mixture consisting of 40 parts by weight of cyclohexanone, 30 parts by weight of isobutanol, 20 parts by weight of the adduct of 7 moles of ethylene oxide to 1 mole of iso-octylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound 4 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound 5 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 8

3 parts by weight of compound 6 is intimately mixed with 97 parts by weight of particulate kaolin. A dust is obtained containing 3% by weight of the active ingredient.

EXAMPLE 9

30 parts by weight of compound 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A process for repelling insects which comprises applying to the skin of humans or animals exposed to settling by insects thereon an insect-repellant amount of a halobenzoylpropionic acid ester having the formula

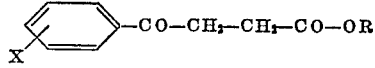

where X denotes bromine or chlorine and R denotes an aliphatic hydrocarbon radical having 1 to 10 carbon atoms which may be substituted by chlorine, bromine, iodine, hydroxyl, methoxyl, or ethoxyl.

2. A process as claimed in claim 1 wherein said ester is p-bromobenzoyl-β-propionic acid ethyl ester.

3. A process as claimed in claim 1 wherein said insects are houseflies or gnats.

4. A process as claimed in claim 1 wherein R is alkyl of 1 to 10 carbon atoms.

5. A process as claimed in claim 1 wherein X is p-bromine.

References Cited

Chemical Abstracts, 1961, vol. 55, p. 1521e.

ALBERT T. MEYERS, Primary Examiner

V. D. TURNER, Assistant Examiner

U.S. Cl. X.R.

424—Dig. 10